United States Patent
Belanger et al.

(10) Patent No.: US 9,652,490 B2
(45) Date of Patent: *May 16, 2017

(54) CONDENSING EVENT MARKERS

(71) Applicant: Dropbox, Inc., San Francisco, CA (US)

(72) Inventors: Maxime Belanger, San Francisco, CA (US); Kyle Consalus, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,508

(22) Filed: Aug. 11, 2015

(65) Prior Publication Data

US 2015/0347497 A1    Dec. 3, 2015

Related U.S. Application Data

(63) Continuation of application No. 13/725,661, filed on Dec. 21, 2012, now Pat. No. 9,128,932.

(51) Int. Cl.
*G06F 17/30* (2006.01)
*G06F 17/24* (2006.01)

(52) U.S. Cl.
CPC .. *G06F 17/30371* (2013.01); *G06F 17/30002* (2013.01); *G06F 17/30165* (2013.01); *G06F 17/30575* (2013.01); *G06F 17/24* (2013.01); *G06F 17/241* (2013.01); *G06F 17/30383* (2013.01)

(58) Field of Classification Search
CPC .. G06F 17/24; G06F 17/241; G06F 17/30002; G06F 17/30383; G06F 17/30371; G06F 17/30165; G06F 17/30575

USPC ........................................................ 707/687
See application file for complete search history.

(56) References Cited

U.S. PATENT DOCUMENTS

| | | | |
|---|---|---|---|
| 6,158,019 A * | 12/2000 | Squibb ................ | G06F 11/1469 714/13 |
| 8,407,290 B2 * | 3/2013 | Abt, Jr. ............... | G06F 17/3089 707/608 |
| 2006/0161635 A1 | 7/2006 | Lamkin et al. | |
| 2008/0215964 A1 | 9/2008 | Abrams et al. | |
| 2008/0288499 A1 | 11/2008 | Choi et al. | |
| 2009/0157608 A1 | 6/2009 | Strathearn et al. | |
| 2009/0216806 A1 | 8/2009 | Feuerstein et al. | |
| 2010/0174993 A1 | 7/2010 | Pennington et al. | |
| 2010/0312754 A1 | 12/2010 | Bear et al. | |
| 2012/0066573 A1 | 3/2012 | Berger et al. | |
| 2012/0117116 A1 * | 5/2012 | Jacobson .......... | G06F 17/30657 707/792 |

(Continued)

*Primary Examiner* — Kris Mackes
*Assistant Examiner* — Tiffany Bui
(74) *Attorney, Agent, or Firm* — Polsinelli PC (57) ABSTRACT

Systems, methods, and computer-readable storage media for analyzing the recorded interactions of users within a shared dataspace, where the shared dataspace is provided by an a synced online content management system. As each user adds and deletes files in the shared dataspace, the content management system can record each interaction. The content management system can then analyze the recorded interactions, creating collapsed summaries of the interactions, and generate notifications that can be presented to users. Various thresholds can be used to determine when the recorded interactions are condensed, and when notifications associated with those condensed interactions are presented to users.

20 Claims, 6 Drawing Sheets

(56) References Cited

U.S. PATENT DOCUMENTS

| | | | |
|---|---|---|---|
| 2012/0143817 A1* | 6/2012 | Prabaker | G06F 17/30165 |
| | | | 707/608 |
| 2012/0191715 A1 | 7/2012 | Ruffner et al. | |
| 2012/0192086 A1 | 7/2012 | Ghods et al. | |
| 2012/0222133 A1 | 8/2012 | Kidron | |
| 2012/0331568 A1 | 12/2012 | Weinstein et al. | |
| 2013/0014023 A1 | 1/2013 | Lee et al. | |
| 2013/0080919 A1 | 3/2013 | Kiang et al. | |
| 2013/0110565 A1 | 5/2013 | Means, Jr. et al. | |
| 2013/0173531 A1* | 7/2013 | Rinearson | G06F 17/30011 |
| | | | 707/608 |
| 2014/0095693 A1* | 4/2014 | Apte | H04L 67/1008 |
| | | | 709/224 |
| 2014/0101095 A1* | 4/2014 | Van Riel | G06F 17/30861 |
| | | | 707/608 |

\* cited by examiner

| Action | Time | Filename | User |
|---|---|---|---|
| Add | 10/1/12 1:25 PM | Texas.doc | Bob |
| Add | 10/1/12 1:26 PM | Florida.doc | Bob |
| Add | 10/1/12 1:27 PM | Alabama.doc | Bob |
| Delete | 10/2/12 3:01 PM | Texas.doc | James |
| Add | 10/2/12 9:03 PM | California.jpg | James |
| Replace | 10/3/12 11:30 AM | Florida.doc | Mike |
| Delete | 10/3/12 11:31 AM | Alabama.doc | Mike |

Event Marker Feed

FIG. 3

Collapsed Event Feed for Bob — 300

- On 10/1/12, you added 3 files
- On 10/2/12, James added 1 file and deleted your file Texas.doc
- On 10/3/12, Mike deleted 1 file and replaced 1 file

Notification for Cindy — 400

- Bob, James, and Mike have added new files this week accounting for 5% of available storage space
- Mike and James have both deleted files this week (402)

CONDENSING EVENT MARKERS

CROSS REFERENCE TO RELATED APPLICATIONS

This application is a continuation of U.S. patent application Ser. No. 13/725,661, filed Dec. 21, 2012, the contents of the above patent application is hereby expressly incorporated by reference in its entirety for all purposes herein.

TECHNICAL FIELD

The present disclosure pertains to condensing event markers and more specifically to condensing event markers of a shared dataspace based on a common factor shared among several event markers, then preparing a notification based on the condensed event marker for a user associated with the shared dataspace.

BACKGROUND

Digests or compendiums condense or abbreviate data, yielding more efficient reports and descriptions of the data when compared to the "raw" data. For example, a "daily digest" email can take all the emails sent to a listserv or an email address over a 24-hour period and compile them into a single email summarizing the previous 24 hours of listserv/email account activity. Similarly, reports of manufacturing activity can be automated to report the production of specific widgets within a specific time period. Yet another example of a digest are the plot summaries provided at the beginning of television shows, where brief summaries of previous episodes explain continuing plot lines from previous episodes to remind and inform current viewers, making for an improved viewing experience.

When storing data, servers and databases can record every interaction a user or users has with the database. Database managers or other users can then search through these interactions for specific events, such as when a user added or modified a specific file. However, because these lists of interactions can grow to significant size, users parsing through the data may encounter difficulty discerning patterns when looking at individual interactions. Where multiple users can be granted access to a database, server, or cloud-based storage space, this storage area can be referred to as a "shared dataspace."

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

Disclosed are systems, methods, and non-transitory computer-readable storage media for condensing event markers of a shared dataspace. Programs and applications can record every interaction with a shared database, with the records of those interactions being named event markers. Exemplary event markers include records of the name of a file uploaded to the database, when the file was uploaded, who performed the uploading, the size of the file, where the file was stored, granting of access to the shared dataspace to a particular user, etc. To condense long lists of event markers, an example system can search for a commonality shared among several or all of the event markers recorded. The commonality can include one or more factors such as time of the events, event type, event location, users performing the events, a source of the event, and so forth.

When condensing the event markers, the system can consider event granularity. For example, if the system is processing 100 event markers, should the condensed event markers summarize every 5 event markers, every 20 event markers, or all 100 event markers? Such considerations can be determined based on one or more common traits, or commonalities. As an example, the system can condense a list of event markers recording the uploading, downloading, and deletion of documents to three "condensed event markers," one for each of uploading, downloading, and deleting documents. Alternatively, the system may organize condensed event markers by activities that occur within specific time periods, such as the activities within a given hour, day, week, or month. In yet another alternative, the system can determine granularity based on multiple traits or shared traits. For example, the list could be condensed based on both the time and the user who performed the action, leading to condensed event markers such as "Bonnie—upload—two documents—12/11/10," and "Clyde—delete—3 files—9/9/09." A granularity threshold, which quantifies the granularity of the system, can be automatically set by the system or can be based on user preferences or user-provided configurations.

The system can then communicate condensed event markers to a user associated with the shared dataspace. To do so, the system can prepare a notification describing the condensed event markers. A server associated with hosting or providing the shared dataspace can generate and transmit the notifications to a client. In one configuration, the server can communicate the notifications to client software installed at the client. Then the client software can generate a popup, audible, or other notification to a user. In other variations, the server may not actively 'push' the notifications to the user, but simply enter the condensed event markers as an entry in a log. Then the user can review the log at a later time to see the condensed event markers. Using the previous examples, the system could generate a notification stating "Bonnie added two documents yesterday," or "Clyde deleted three files last week." These notifications can be user specific. Therefore, rather than stating "Bonnie added two documents yesterday," the notification might read "You added two documents yesterday afternoon."

Various configurations and factors can determine when to communicate notification to a user. For example, users can configure the system to send notifications on the basis of time, such as every hour, every day, every week, or every month, or can configure the system to automatically send the notification upon satisfying a particular threshold or factors. Exemplary instances of thresholds that can initiate communication of a notification to a user can include a number of activities recorded as event markers (such as 5 files added), a percentage of the shared dataspace that was used or released within a specific time period, a percentage of the shared dataspace remaining, or the actions of a particular user. The system can condense a same set of events into different sets of condensed entries for different users or for different situations. Alternatively, the system can determine that events that are otherwise eligible for condensing in to a single event are not condensed for particular situations or event patterns.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for an improved method of condensing event markers and providing notifications of those condensed event markers to users.

Figure 1:
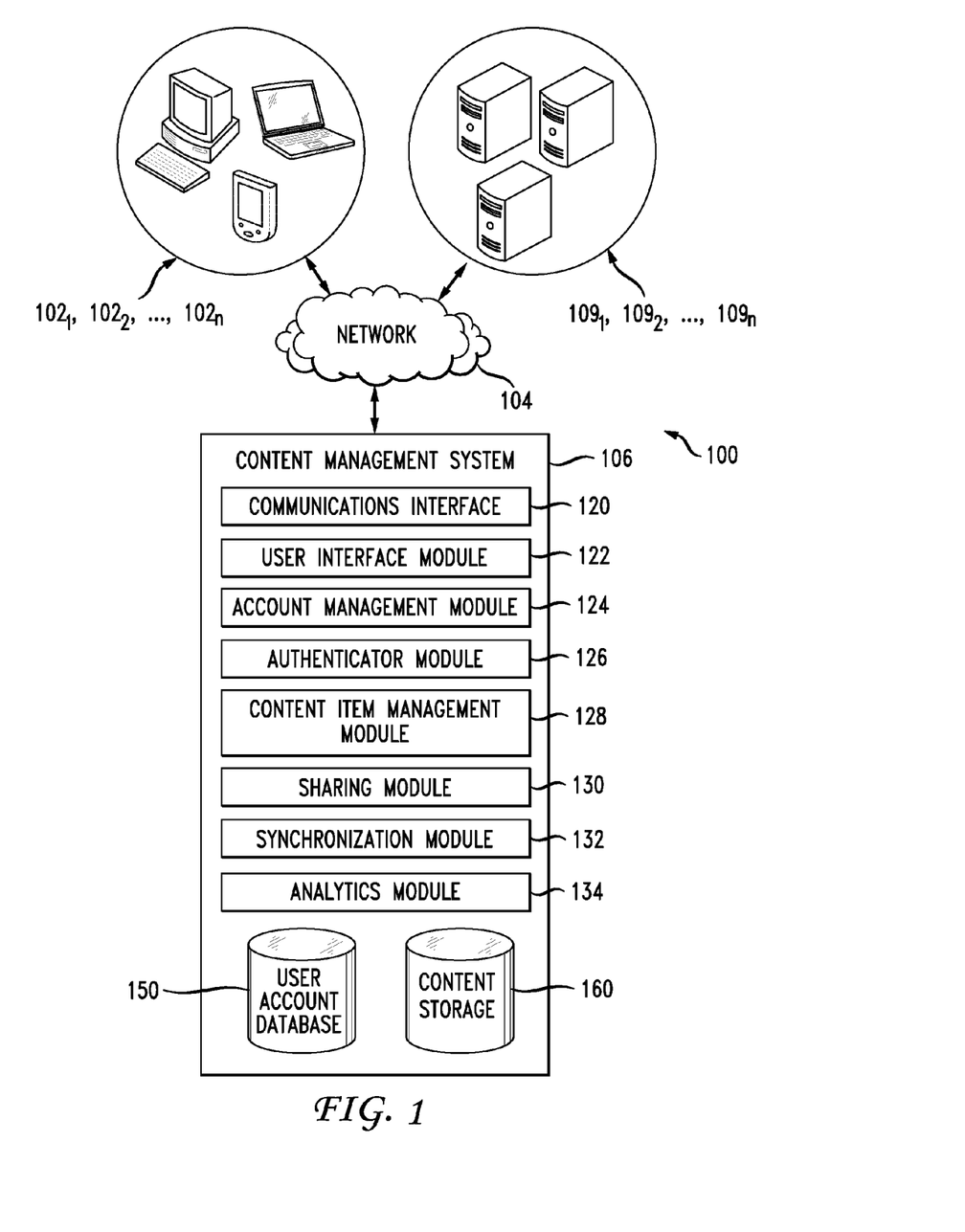
FIG. 1 shows an exemplary configuration of devices and a network in accordance with the invention.

An exemplary system configuration 100 is shown in FIG. 1, wherein electronic devices communicate via a network for purposes of exchanging content and other data. System 100 can be configured for use on a wide area network such as that shown in FIG. 1. However, the present principles are applicable to a wide variety of network configurations that facilitate the intercommunication of electronic devices, such as a local area network, wireless network, etc. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device 102. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102, can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$.

However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, content management system 106 can include an event processing module and/or a notifications module.

Figure 2:
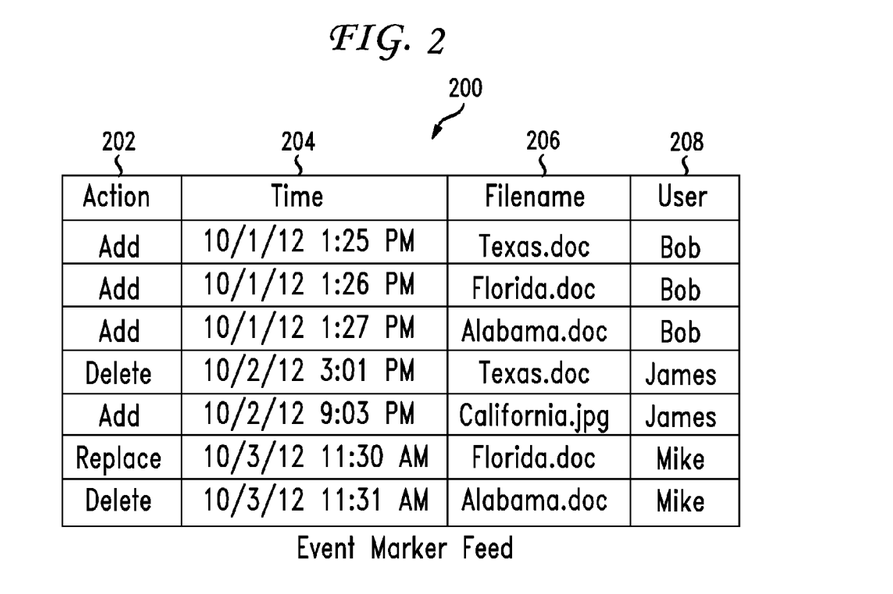
FIG. 2 shows an example event marker feed.

Having disclosed some system components, the disclosure now turns to FIG. 2, which shows exemplary event marker feed 200. Event marker feed 200 is associated with a shared dataspace or storage space provided by content management system 106 as described in FIG. 1. This shared dataspace can be accessible by a single individual, or can be shared among multiple people or groups. As the user or users interact with the shared dataspace, content management system 106 can record each interaction in event marker feed 200. In one variation, only particular classes or categories of events may be recorded in event marker feed 200, such as file operations that modify a file, whereas other types of operations that do not modify a file may not be recorded. For example, content management system 106 can record renames, deletes, moves, creates, and so forth, while not recording browsing operations, file views, sharing events, or other operations that do not modify file contents or file metadata.

Each row in an event marker feed can represent an activity or interaction with the shared dataspace by a user. Exemplary interactions can include, but are not limited to, adding a file, deleting a file, modifying a file, renaming a file, granting a user access to the shared dataspace, removing a user's access to the shared dataspace, granting a user administrative rights in the shared dataspace, making a file public, and making a directory public. To illustrate, consider the interactions of Bob with the shared dataspace. Bob uploads, or adds, three files on Oct. 1, 2012 within minutes of each another—Texas.doc, Florida.doc, and Alabama.doc. When the user makes changes to the local file system, which are later synced to the shared dataspace, content management system 106 can rely on the time of the changes at the local file system, or on the time that the changes are synced to the shared dataspace, or on some combination thereof. This can be useful for distinguishing and organizing file operations that occurred at multiple different times while the client software is offline, and which are later synced to content management system 106 at the same time.

These interactions can be recorded as event markers, where the event marker describes the interaction by recording the type of activity 202, when the interaction takes place ("Time") 204, what file or directory was interacted with ("Filename") 206, and who performed the interaction ("User") 208. As shown, each event marker occupies a separate row in event marker feed 200, however, other configurations can have event markers organized into columns, separate records or structures, chained together using pointers, or other programming/data management techniques for organizing multiple event markers.

As other users having access to the shared dataspace interact with the database, their actions can be similarly recorded. In event marker feed 200, the interactions with James and Mike are recorded after Bob's interactions. However, while feed 200 only shows 7 interactions, other feeds can have hundreds, thousands, millions, or more interactions recorded as event markers. Whereas analyzing the shown 7 event markers is relatively simple, analyzing thousands or millions of interactions can be cumbersome without means for automating the analysis and providing meaningful summaries of the interactions.

Figure 3:
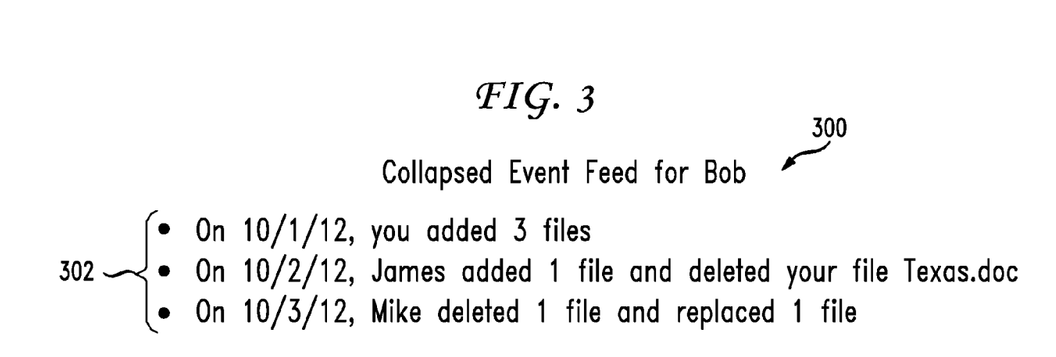
FIG. 3 shows an example of a collapsed event marker feed.

FIG. 3 shows exemplary collapsed event feed 300. In this example, the seven event markers of event feed 200 of FIG. 2 have been condensed into only 2 collapsed event markers 302. Each collapsed event markers 302 describe interactions recorded in the event marker feed shown in FIG. 2 based on when the actions were performed. Therefore, as shown each collapsed event marker is organized by the day on which the associated actions were performed. In this example, each event shown in FIG. 2 is collapsed, grouped, or condensed in the collapsed event feed 300. However, the system may collapse only some subset of events that meet certain criteria or that satisfy a certain threshold. Collapsed event feed 300 can thus include some events that are unmodified (uncollapsed) and other collapsed events that represent multiple events as single sub-events. In one variation, the user can click on, hover the cursor over, or otherwise interact with a collapsed event to view additional details about the collapsed event or about events that make up the collapsed event. For example, the system can present the additional details as a popup or can expand a part of the collapsed event feed and display the additional details in the expanded space.

In other configurations the collapsed event markers can be organized and condensed based on the type of interactions, interactions with specific files, or any additional information recorded in the event marker feed. For example, event marker feed 200 of FIG. 2 could, instead of being organized based on time, be condensed based on specific actions, resulting in collapsed event markers such as: "4 files were added," "2 files were deleted," and "1 file was replaced." How content management system 106 determines to condense event marker feeds can be predetermined, or can be customized based on user preferences, circumstantial needs, and/or system requirements.

As content management system 106 condenses the event markers into a list of collapsed event markers, content management system 106 can determine a quantity of event markers to merge into a single collapsed event or a threshold for determining whether to merge individual events. This determination can be based on a level of granularity content management system 106 wishes to convey to future users. For instance, a system reducing an event marker feed of 1,000 event markers to 5 collapsed event markers has a finer granularity than a system which condenses the 1,000 event markers to 20 collapsed event markers.

Content management system 106 can operate according to a threshold that may condense fewer than all of a given set of events. Some sets of event data may not be formed in such a way that condensing more than a handful of the events makes sense. For example, the event data may describe mostly single file change events that do not have any apparent connection in time, type, or location. While some systems can rely on relative comparisons of granularity (fine-grained v. course-grained) other systems can quantify the levels of granularity based on specific numbers or percentages. One example of this would be determining the granularity based on the maximum number of event markers to be combined in a given collapsed event, whereas other forms of determining granularity can be based on the number of collapsed events visible on a monitor or other display at a given time.

In yet other examples, the granularity can be determined based on the amount of time between interactions. Therefore, in one configuration content management system 106 could condense any interactions with the shared dataspace that occur within 15 minutes of each another, whereas in other configurations it could condense every interaction which occur within an hour, a day, or other time periods. The granularity can also be based on classifications of certain users. If Bob, James, and Mike were all co-workers, where Mike was a supervisor of Bob and James, the interactions of Bob and James might be condensed together, with Mike's interactions condensed separately. Yet other configurations can condense the feed in multiple ways or using multiple common factors or attributes. Thus the collapsed event markers can be organized both by the user who interacted with the shared dataspace and the type of action performed, or any other combination of factors or attributes. Content management system 106 can collapse a same set of events differently for display to different users. For example, content management system 106 can condense events relating to a shared folder differently for users of the space based on their activity in the shared folder, such as condensing only closely related events for an owner of the folder and condensing all the events into a daily digest for users who rarely access or use the folder.

The condensed feeds can be generated for a specific individual, or can be generic in nature. As shown, collapsed event feed 300 is specifically generated for Bob. Bob can have user preferences stored that pre-determine the granularity of the collapsed event markers, how often the collapsed event markers are determined, what attributes are used to condense the event marker feed, and who has access to the collapsed event marker feed. Should Mike, James, or another user attempt to view the collapsed event marker feed, the listed collapsed event markers could be organized differently based on user preferences for that user. In this way, the system can store more than one set of collapsed event markers, or can generate the collapsed event markers separately in an on-demand configuration, waiting to create the collapsed event marker feed until requested or accessed by a user.

Figure 4:
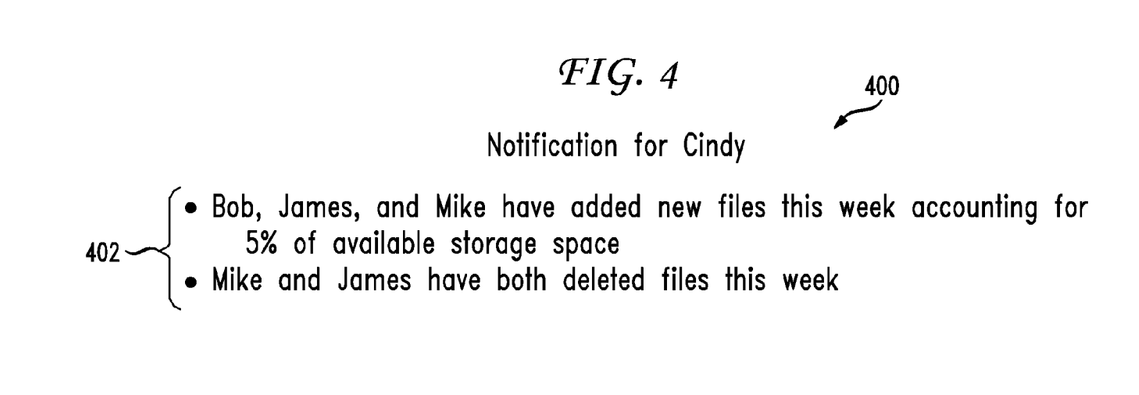
FIG. 4 shows an example of notifications.

Having generated the collapsed event feed, content management system 106 can generate notifications for a user. Content management system 106 can transmit the notifications to users via a web interface, text message, email or email digest, a popup, or other notification on a local software client, for example. In another variation, content management system 106 can generate notifications which are not presented to the user directly, but which are entered in a log file or an event history that the user can choose to view. FIG. 4 shows an example of such notifications using notification 400. Here, the event markers of FIG. 2 have been condensed into collapsed event markers similar or equivalent to the collapsed event markers of FIG. 3, and content management system 106 has determined that notifications 402 should be sent to a user named Cindy. These notifications can be similarly customized based on user preferences, can be based on system notifications and thresholds, or can be based on a generic or predetermined configuration. In this illustration, content management system 106 has generated a notification based on the fact that 5% of the available data storage in the shared dataspace was filled in the current week. In other configurations, specific thresholds such as an amount of the dataspace filled in a given time period, amount of dataspace remaining, a number of interactions or a number of a type of interaction, a given amount of time passing without sending notifications, and/or other preferences or settings defined by users or determined based on user history and actions. As an example, Cindy could set a preference that she would like to know when files added to the shared dataspace in any given week occupy more than 3% of the total shared dataspace available. Cindy could also set as a preference to receive a notice anytime files are deleted from the shared dataspace, and information regarding who performed that action. Other exemplary notifications that a user could request to receive include a notification at least once a week (or month, or hour) regarding significant changes to the shared dataspace, where the determination of "significant" is either determined by content management system 106 or selected as a preference by the user.

Content management system 106 can send multiple notifications to multiple users. Such multiple notifications can all be identical or customized for each user. In addition, the notifications can be based on previously collapsed event markers, or the event markers can be collapsed due to a threshold associated with a notification being reached. For instance, a preference could cause content management system 106 to generate notifications regarding the number of files added, deleted, and modified in the shared dataspace every week. Based on that preference, content management system 106 can collapse the event markers indicating addition, deletion, and modification upon hitting the week threshold, and use the generated collapsed event markers to create the notifications. Similarly, if a preference indicates a desire for content management system 106 to send notifications when the shared dataspace is filled to 50% capacity, 75% capacity, and 95% capacity, upon reaching those threshold values content management system 106 can initiate the condensing or collapsing of event markers, and use the newly created collapsed event markers to generate the associated notifications.

Content management system 106 can detect that initial groupings of file events can be replaced or updated. For example, if content management system 106 recognizes that a first collapsed event describes 10 photo upload events at 3:30 pm, a second collapsed event describes 8 photo upload events at 3:33 pm, and a third collapsed event describes 11 photo upload events at 3:38 pm, the system can combine the three events later, or can perform an analysis of previously collapsed events within a threshold in the past when processing new events. In this example, the system can combine the three collapsed events so that a single collapsed event describes 29 photo upload events between 3:30 pm and 3:38 pm.

Figure 5:
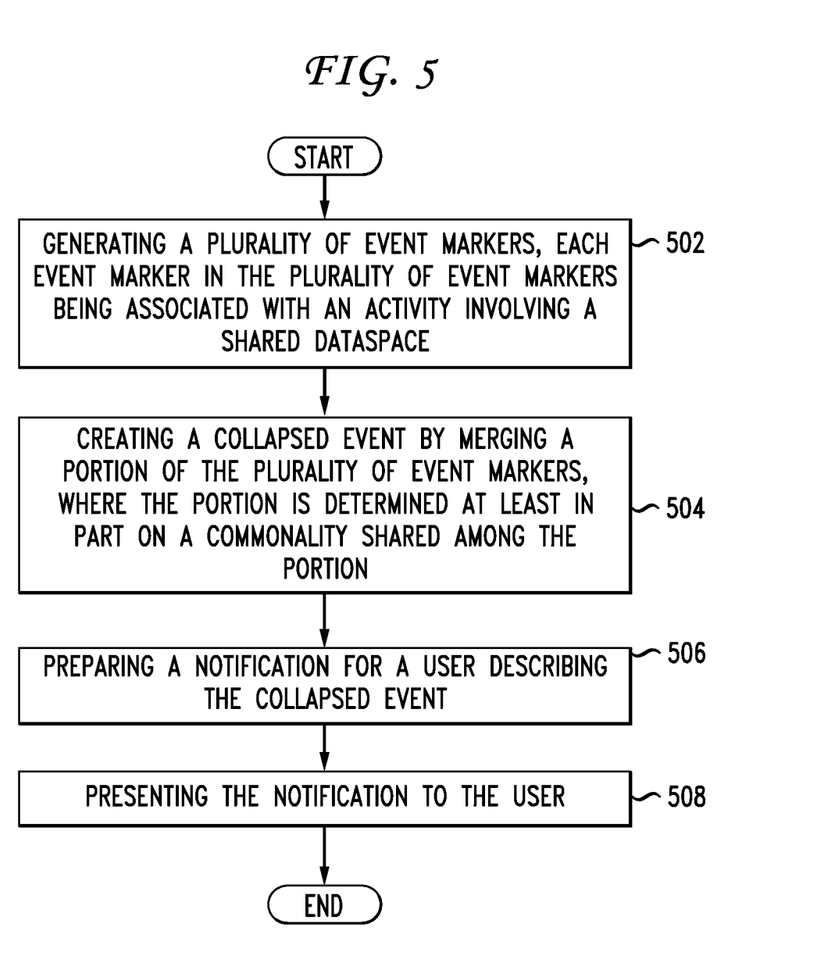
FIG. 5 shows an example method embodiment.
Figure 6A:
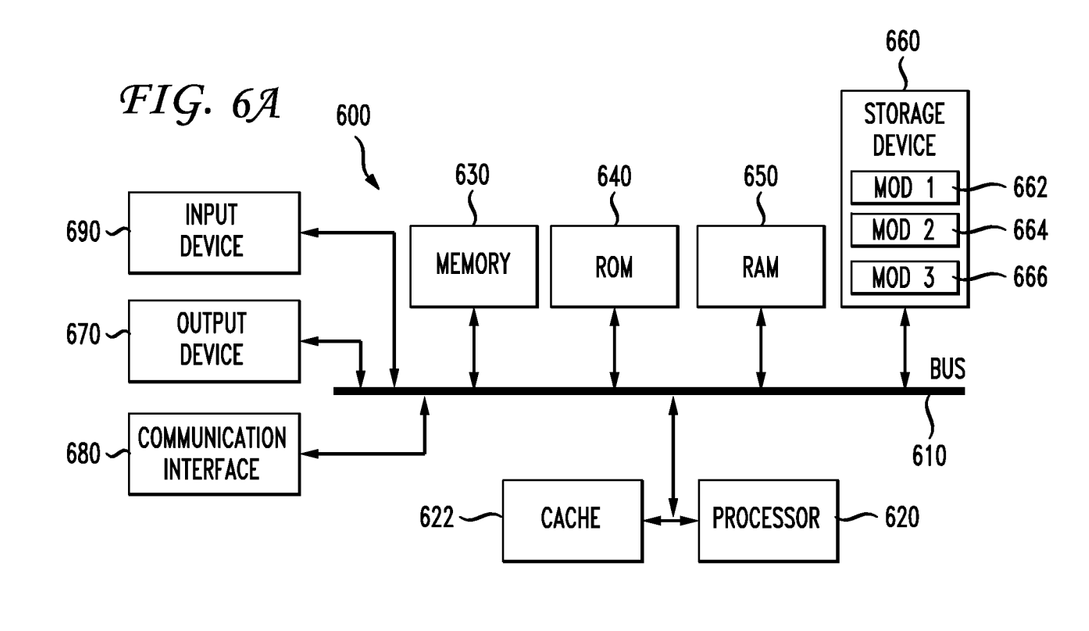
FIG. 6A shows a conventional system bus computing system architecture.
Figure 6B:
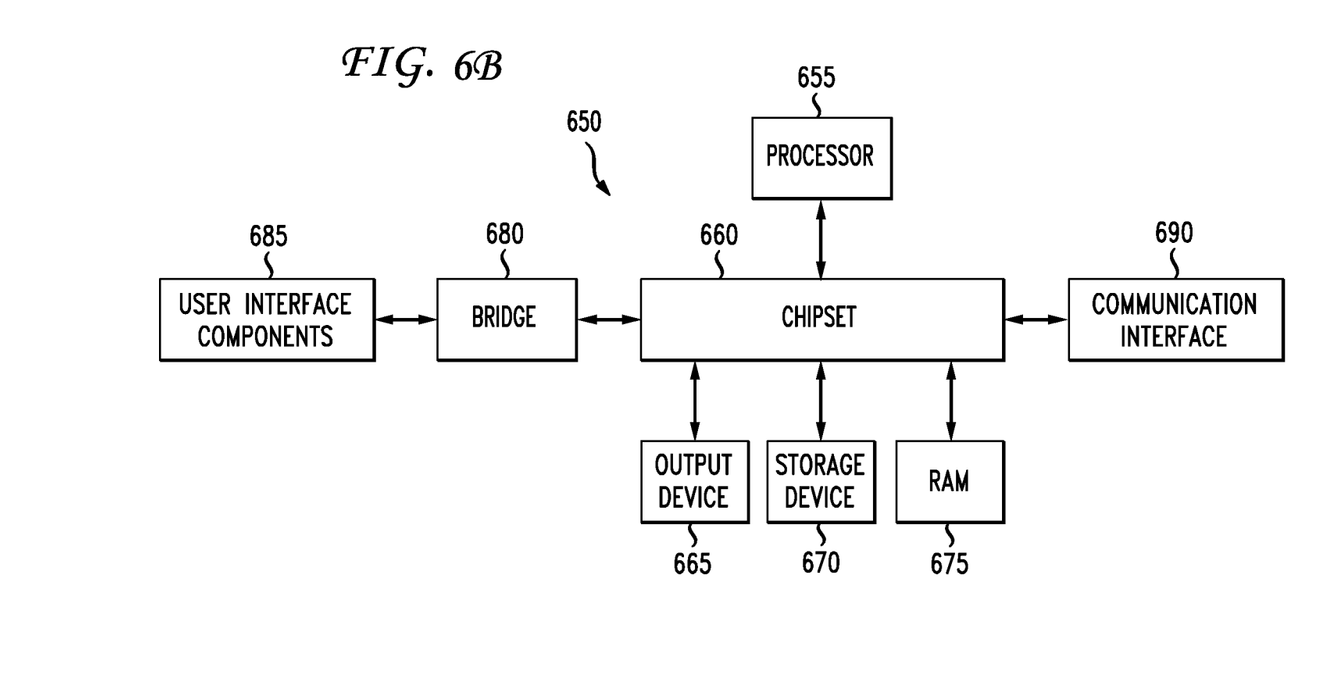
FIG. 6B shows a computer system having a chipset architecture.

Having disclosed some basic system components and concepts, the disclosure now turns to the exemplary method embodiment shown in FIG. 5. For the sake of clarity, the method is described in terms of an exemplary content management system, such as content management system 106 as shown in FIG. 1 configured to practice the method. The steps outlined herein are exemplary and can be implemented in any combination thereof, including combinations that exclude, add, or modify certain steps.

Content management system 106 can generate a plurality of event markers, each event marker in the plurality of event markers being associated with an activity involving a shared dataspace (502). Examples of such activity include, but are not limited to, adding a file to the shared dataspace, deleting a file, moving a file, renaming a file, modifying a file, providing a user access to the shared dataspace, limiting access and/or administrative capacity of a user to the shared dataspace, making a file public, making a file private, making a new directory or folder, and restricting public access to any portion of the shared dataspace.

Content management system 106 can then create a collapsed event by merging a portion of the plurality of event markers, where the portion is determined at least in part based on a commonality shared among the portion (504). This portion can be determined using a granularity threshold, such as a period of time, a data size associated with each event marker in the plurality of event markers, a quantity of the plurality of event markers, a data similarity, a file type similarity, and a number of event markers associated with a particular activity. The commonality, or shared attribute, can be any shared quality, or data point associated with the activity. Non-limiting examples of these commonalities include a point of origin of the portion of the plurality of event markers, the shared dataspace, a user performing the interaction, the form of interaction, a period of time during which the interaction took place, where the interaction originated (such as a particular state or country), a duration of the interaction, bandwidth or data size associated with the interaction, or a number of communication errors in the interaction. The commonality can also indicate that a threshold has been reached, such as a particular number of interactions, a number of users being added to the shared dataspace, a percentage of the shared dataspace being occupied, or a number of interactions from a particular location.

The collapsed events can be created based on specific user preferences, or can be based on content management system 106 needs and determinations. If based on user preferences, the commonalities used can indicate the particular preferences that a user has in viewing the collapsed event marker feed. For instance, should a user consistently sort a list based on the times of interaction, content management system 106 can recognize this pattern of usage and organize the collapsed events based on interaction times. These patterns of use, and derived user preferences, can shift with time and can vary how the event markers are organized in the collapsed event marker feed given a time and/or circumstance.

Content management system 106 can then prepare a notification for a user describing the collapsed event (506). This notification can be specific to the user and based on user preferences, either entered by the user or gleaned by the system 100 from previous user interactions, or can be generic. These notifications can be initiated based on meeting thresholds as well. For instance, content management system 106 could recognize that a percentage of the shared dataspace has been recently occupied and issue a notification. Other possible causations for the generation of notifications can include the passage of a set amount of time, a number of event markers obtained, or patterns derived using the event markers and/or commonalities previously described. Generally, although not always, the notification can present the collapsed event markers in a natural language configuration, making the collapsed event marker readable to a user. Should the user require, language and/or grammatical processing of the notification can aide in the user receiving a notification that presents the collapsed event marker in a comprehensible fashion.

Finally, content management system 106 can present this notification to the user (508). This presentation can take place through any acceptable means of presentation, such as communication of the notification to a display device, printing a report, or sending a text or email message. The presentation can occur via a software client or as a log, and can be modified based on the technical capacity of a user device associated with the user. As with preparing the notification, presentation of the notification can also depend on the meeting of a threshold value. For instance, while the notification may be prepared on Sunday night, the threshold may indicate not to email the notification until 8 AM Monday morning. In other circumstances, the threshold for presenting the notification can be tied directly with the creation of the notification and/or collapsing of the event marker feed. In such an instance, upon creating a collapsed event marker, content management system 106 can automatically generate a notification (which can be specific to a user or can be generic) and present that notification to a user. Certain configurations and embodiments can await an acknowledgment of the notification after presenting the notification. This acknowledgment can then initiate further actions within the event markers, the collapsed event markers, additional notifications, or can initiate further interaction with the shared dataspace.

FIG. 5A, and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
generating, by one or more processors, a plurality of event markers, the plurality of event markers being associated with respective activities involving an account in a synchronized online content management system, wherein at least one of the respective activities comprises modifying content synchronized between the synchronized online content management system and one or more client devices associated with the account, the content being associated with the account;
condensing, by the one or more processors, the plurality of event markers to yield a condensed event marker by merging a first portion of the plurality of event markers based on at least one commonality between the plurality of event markers and filtering a second portion of the plurality of event markers, wherein the commonality comprises at least one of: a point of origin of event markers, a shared dataspace, the respective activities, or a period of time; and
preparing and presenting to the account, by the one or more processors, a notification describing one or more of the respective activities associated with the condensed event marker;
wherein the condensing of the plurality of event markers to yield the condensed event marker is triggered by a predetermined parameter that is different than the at least one commonality, the predetermined parameter comprising an indication that: a particular percentage of shared dataspace was used or released within a specific time period or a percentage of the shared dataspace remaining is below a threshold.

2. The method of claim 1 wherein each of the plurality of event markers being associated with respective activities comprises at least one of: a first indication of a type of activity associated with a corresponding one of the respective activities, a second indication of a time of the corresponding one of the respective activities, a third indication of a content item associated with the corresponding one of the respective activities, or a fourth indication of a respective user account associated with the corresponding one of the respective activities.

3. The method of claim 1, wherein one or more of the respective activities comprises one or more interactions between one or more user accounts and content at the synchronized online content management system.

4. The method of claim 1, wherein the one or more of the respective activities associated with the condensed event and described in the notification are different than the predetermined parameter.

5. The method of claim 1, further comprising generating an event feed comprising the condensed event and an uncondensed event, wherein the condensed event represents a plurality of events and the uncondensed event represents a single event.

6. The method of claim 1, wherein the shared dataspace is associated with the account and one or more second accounts, and wherein the indication that the particular percentage of shared dataspace was used or released within the specific time period or the percentage of dataspace remaining is below the threshold, based on at least one of a first determination of a first change in a first size of the shared dataspace used by the account and the one or more second accounts, or a second determination of a second change in a second size of dataspace assigned to the account and one or more second accounts as part of the shared dataspace.

7. The method of claim 1 wherein the first portion of the plurality of event markers is determined using a granularity threshold, the granularity threshold comprising a period of time, a data size associated with each event marker in the plurality of event markers, a quantity of the plurality of event markers, a file time, a data similarity, or a number of event markers associated with a particular activity.

8. A non-transitory computer-readable storage medium having processor-executable instructions stored therein for causing one or more processors to:
generate a plurality of event markers being associated with respective activities involving at least one file stored in an account in a synchronized online content management system, wherein at least one of the respective activities comprises modifying the at least one file, the at least one file being synchronized between the synchronized online content management system and one or more client devices associated with the account in the synchronized online content management system, the at least one file being associated with the account;
create a collapsed event marker by merging a portion of the plurality of event markers based on at least one commonality between one or more respective activities associated with the portion of the plurality of event markers, wherein the at least one commonality comprises at least one of: a point of origin of the portion of the plurality of event markers, a shared dataspace, the respective activities, or a period of time; and
prepare and present, to a user associated with the account a notification describing a one or more events or activities associated with the collapsed event marker;
wherein the creating of the collapsed event marker is triggered by a triggering event, the triggering event comprising an indication that: a particular percentage of shared dataspace was used or released within a specific time period or a percentage of the shared dataspace remaining.

9. The non-transitory computer-readable storage medium of claim 8 wherein each of the plurality of event markers comprises at least one of: a first indication of a type of activity associated with a corresponding one of the respective activities, a second indication of a time of the corresponding one of the respective activities, a third indication of a content item associated with the corresponding one of the respective activities, or a fourth indication of a respective user account associated with the corresponding one of the respective activities.

10. The non-transitory computer-readable storage medium of claim 8 wherein the respective activities comprise at least one of adding a file, deleting a file, moving a file, renaming a file, providing a user access to the shared dataspace, limiting access to the shared dataspace to a user, making a file public, making a directory public, and restricting public access to the shared dataspace.

11. The non-transitory computer-readable storage medium of claim 8, wherein the particular percentage of shared dataspace or the percentage of shared dataspace are determined based on a first change to a first total size of the shared dataspace used or a second change to a second total size of dataspace defined for the shared dataspace.

12. The non-transitory computer-readable storage medium of claim 8 wherein the notification is modified based on a capability of a user device associated with the account.

13. The non-transitory computer-readable storage medium of claim 12 wherein the presenting of the notification is provided through at least one of a software client or a log.

14. The non-transitory computer-readable storage medium of claim 8 wherein the first portion of the plurality of event markers is determined using a granularity threshold, the granularity threshold comprising a period of time, a data size associated with each event marker in the plurality of event markers, a quantity of the plurality of event markers, a file time, a data similarity, or a number of event markers associated with a particular activity.

15. A system comprising:
one or more processors; and
at least one non-transitory computer-readable storage medium having processor-executable instructions stored therein for causing the system to:
generate a plurality of event markers associated with respective activities involving an account in the system, wherein at least one of the respective activities comprises modifying content synchronized between the system and one or more client devices associated with the account, the content being associated with the account;
condensing the plurality of event markers to yield a condensed event marker by merging a first portion of the plurality of event markers based on at least one commonality between a respective activity associated with each of the plurality of event markers and filtering a second portion of the plurality of event markers, wherein the commonality comprises at least one of: a point of origin of the first portion of the plurality of event markers, a shared dataspace, the respective activities, or a period of time; and
prepare and present, to a device associated with the account, a notification describing one or more activities associated with the condensed event marker; and
wherein the condensing of the plurality of event markers to yield the condensed event marker is triggered by a triggering event, the triggering event comprising: a particular percentage of shared dataspace being used or released within a specific time period or a percentage of the shared dataspace remaining.

16. The system of claim 15 wherein the particular percentage of shared dataspace being used or released within the specific time period or the percentage of the shared dataspace remaining are determined based on a first change to a first total size of the shared dataspace used or a second change to a second total size of dataspace defined for the shared dataspace.

17. The system of claim 15 wherein one or more of the respective activities comprise at least one of adding a file, deleting a file, moving a file, renaming a file, providing a user access to the shared dataspace, limiting access to the shared dataspace to a user, making a file public, making a directory public, and restricting public access to the shared dataspace.

18. The system of claim 15, wherein the percentage of the shared dataspace remaining comprises the triggering event when the percentage of the shared dataspace remaining is below a dataspace threshold.

19. The system of claim 15 wherein the notification is modified based on a capability of a user device associated with the account.

20. The system of claim 15 wherein the first portion of the plurality of event markers is determined using a granularity threshold, the granularity threshold comprising a period of time, a data size associated with each event marker in the plurality of event markers, a quantity of the plurality of event markers, a file time, a data similarity, or a number of event markers associated with a particular activity.

* * * * *